United States Patent
Marumoto

(10) Patent No.: US 7,655,314 B2
(45) Date of Patent: Feb. 2, 2010

(54) INTERLAYER FILM FOR LAMINATED GLASSES AND LAMINATED GLASS

(75) Inventor: Tadashi Marumoto, Koka (JP)

(73) Assignee: Sekisui Chemical Co., Ltd., Osaka-shi (JP)

(*) Notice: Subject to any disclaimer, the term of this patent is extended or adjusted under 35 U.S.C. 154(b) by 0 days.

(21) Appl. No.: 10/559,874

(22) PCT Filed: Sep. 1, 2005

(86) PCT No.: PCT/JP2005/015993

§ 371 (c)(1),
(2), (4) Date: Feb. 15, 2007

(87) PCT Pub. No.: WO2006/025484

PCT Pub. Date: Mar. 9, 2006

(65) Prior Publication Data

US 2007/0134487 A1    Jun. 14, 2007

(30) Foreign Application Priority Data

Sep. 2, 2004    (JP) .............................. 2004-255931

(51) Int. Cl.
*B32B 17/10*    (2006.01)
*B32B 27/30*    (2006.01)
*B32B 27/42*    (2006.01)

(52) U.S. Cl. .................. 428/437; 428/323; 428/328; 428/436; 428/524; 428/525

(58) Field of Classification Search ............... 428/323, 428/328, 436, 437, 524, 525
See application file for complete search history.

(56) References Cited

U.S. PATENT DOCUMENTS

| 5,792,559 A | * | 8/1998 | Heithoff et al. ............ 428/437 |
| 6,579,608 B1 | * | 6/2003 | Kondo ........................ 428/323 |
| 6,673,456 B1 | | 1/2004 | Kobata et al. |
| 6,911,254 B2 | * | 6/2005 | Fisher et al. ................ 428/328 |
| 2002/0018163 A1 | | 2/2002 | Yamamoto et al. |

(Continued)

FOREIGN PATENT DOCUMENTS

EP    1193048 A2    4/2002

(Continued)

OTHER PUBLICATIONS

Office Action on a counterpart RU Application No. 2007111895, received by the Japanese patent agent on Jul. 10, 2009 with its English Translation.

(Continued)

*Primary Examiner*—D. S Nakarani
(74) *Attorney, Agent, or Firm*—Connolly Bove Lodge & Hutz LLP

(57) ABSTRACT

It is the object of the present invention to provide an interlayer for laminated glass having an excellent heat ray shielding property and an excellent transparent property which looks a natural color and laminated glass.

The present invention is an interlayer for laminated glass, which is formed by laminating a plurality of layers comprising an adhesive resin, a heat ray shielding resin containing a heat ray shielding fine particle and a color tone compensation resin layer toned to have a color complementary to the color tone of the heat ray shielding fine particle being laminated.

5 Claims, 1 Drawing Sheet

U.S. PATENT DOCUMENTS

2006/0110593 A1 * 5/2006 Fukatani et al. ............ 428/328

FOREIGN PATENT DOCUMENTS

| JP | 06-316443 | 11/1994 |
| --- | --- | --- |
| JP | HEI-8-52840 | 2/1996 |
| JP | 2001-316504 | 11/2001 |
| WO | WO 01/25162 A1 | 1/2001 |
| WO | 02/077081 A1 | 10/2002 |

OTHER PUBLICATIONS

Extended European Search Report in EP Application No. 06776768.3 dated Oct. 8, 2009.

* cited by examiner

INTERLAYER FILM FOR LAMINATED GLASSES AND LAMINATED GLASS

TECHNICAL FIELD

The present invention relates to an interlayer for laminated glass having an excellent heat ray shielding property and an excellent transparent property and laminated glass using this interlayer for laminated glass.

BACKGROUND ART

Since in laminated glass, an object is hard to penetrate when the laminated glass is subjected to an external impact and even though it is broken by the object, fragments of broken glass seldom shatter and therefore it is safe, laminated glass is widely employed in the windowpanes of vehicles such as automobiles, aircrafts, buildings and the like. As laminated glass of this kind, there is widely used laminated glass obtained by bonding an interlayer for laminated glass, which comprises an adhesive resin, for example, a plasticized polyvinyl acetal resin such as a polyvinyl butyral resin plasticized with a plasticizer, between transparent glass plates.

The laminated glass using the above conventional interlayer for laminated glass has high safety, however, it has low heat ray shielding property. Among light rays, infrared rays, having a wavelength of about 780 nm or more which is longer than that of visible light, have a smaller energy quantity than ultraviolet rays by about 10%, however, they have a large thermal effect, and when they are absorbed in a substance once, they are released in the form of heat and result in a temperature rise, and therefore they are generally referred to as heat rays.

Thus, if it becomes possible to shield infrared rays (heat rays), having a large thermal effect, of light rays entering from windshields and side glass of automobiles, the heat ray shielding property is enhanced and a temperature rise of the interior of automobile can be inhibited. As a recent trend, an opening area of windowpanes in automobiles, buildings and the like increases and the necessity of enhancing the heat ray shielding property of the laminated glass and of imparting the heat ray shielding function to opening areas of these windowpanes increases.

By the way, in Patent Document No. 1, there is disclosed an interlayer for laminated glass obtainable by dispersing heat ray shielding fine particles such as indium tin oxide fine particles and antimony-doped tin oxide fine particles having a heat ray shielding property, in an adhesive resin such as plasticized polyvinyl acetal resins, and laminated glass using this interlayer for laminated glass. Such an interlayer for laminated glass and laminated glass have a high heat ray shielding property and also an excellent transparency and are very useful for windowpanes of automobiles, buildings and the like.

But, in such an interlayer for laminated glass and laminated glass having a heat ray shielding property, since the heat ray shielding fine particles dispersed in the interlayer shield visible light in a red color region due to its property and scatter visible light in a blue color region depending on their particle diameter, the resulting transmitted light shows yellow-greenish color tone, and the interlayer for laminated glass and the laminated glass to be obtained take on slightly yellow-greenish color. Therefore, when the concentration of the heat ray shielding fine particles is increased in order to attain a highly heat ray shielding property, a degree of yellow-green color tone is increased. Thus, since in applications requiring a transparent property which looks a natural color, it is impossible to enhance the concentration of the heat ray shielding fine particles, this method is not yet adequately satisfactory for the purpose of attaining a highly heat ray shielding property in a transparent condition and has the problem to be improved in this point. Patent Document No. 1: WO 01/25162

DISCLOSURE OF THE INVENTION

Problems which the Invention is to Solve

The present invention resolves the above problems, and it is an object of the present invention to provide an interlayer for laminated glass and laminated glass which have an excellent heat ray shielding property and an excellent transparent property which looks a natural color.

Means for Solving the Object

The above object can be attained in accordance with the present invention.

That is, the present invention relates to an interlayer for laminated glass, which is formed by laminating a plurality of layers comprising an adhesive resin, a heat ray shielding resin layer containing a heat ray shielding fine particle and a color tone compensation resin layer toned to have a color complementary to the color tone of the heat ray shielding fine particle being laminated. Here, the above adhesive resin is preferably a polyvinyl acetal resin.

And, it is preferred that an ultraviolet absorbing resin layer is further laminated.

Laminated glass, wherein the interlayer for laminated glass of the present invention is bonded between transparent glass plates, also constitutes the present invention.

Hereinafter, the present invention will be described in detail.

As the resin constituting the heat ray shielding resin layer, the color tone compensation resin layer and the ultraviolet absorbing resin layer, there are given adhesive resins used for conventional interlayers for laminated glass, for example, a plasticized polyvinyl acetal resin, an ethylene-vinyl acetate type copolymer resin, an ethylene-(meth)acrylic ester type copolymer resin, a polyurethane elastomer type resin. As the ethylene-vinyl acetate type copolymer resin, a resin containing a component of vinyl acetate in an amount of 18 to 35% by weight as its constituent component is preferable.

The laminated glass using an interlayer comprising these adhesive resins has such basic performance required for laminated glass that transparency is excellent, weather resistance is high, adhesive property is good, penetration resistance is high, and fragments of broken glass seldom shatter. Among others, plasticized polyvinyl acetal resins are superior in a performance balance and preferred.

The polyvinyl acetal resin used in the present invention is not particularly limited and a resin used conventionally as a resin for an interlayer for laminated glass can be used, and for example, resins having an acetalization degree of 60 to 75 mole % and an average polymerization degree of 800 to 3000 are suitably used. When the average polymerization degree is less than 800, the strength of a resin film become too low and therefore the penetration resistance of the laminated glass to be obtained may be deteriorated, and on the contrary when the average polymerization degree is more than 3000, the moldability of the resin film becomes low or the strength of the resin film become too high and therefore the impact absorbing property of the laminated glass to be obtained may be deteriorated. When the acetalization degree is less than 60 mole %, the compatibility with a plasticizer is reduced and therefore it may become difficult to contain a plasticizer in an amount required for securing the penetration resistance and the hygroscopic property of a resin film increases, and on the contrary when the acetalization degree is more than 75 mole %, the strength of a resin film become too low and therefore the penetration resistance of the laminated glass to be obtained may be deteriorated. Among others, a polyvinyl butyral resin is preferred from the viewpoint of having proper adhesive property to glass, excellent transparency and excellent weather resistance.

Incidentally, an average polymerization degree and an acetalization degree of polyvinyl acetal resins such as polyvinyl butyral resin can be measured, for example, according to JIS K 6728 "Testing methods for polyvinyl butyral" or by a nuclear magnetic resonance (NMR) method.

In order to obtain the above polyvinyl acetal resin, a publicly known method is employed. For example, predetermined polyvinyl alcohol is used and dissolved in warm water, and to the obtained aqueous solution, predetermined acid catalyst and aldehyde were added while keeping the aqueous solution at a predetermined temperature, for example, 0 to 95° C., to allow an acetalization reaction to proceed while stirring. Next, a reaction temperature is raised to age the reactant and to complete the reaction, and then the reactant is neutralized, washed with water and dried, and whereby the powder of polyvinyl acetal resin can be obtained.

Here, the above polyvinyl alcohol is normally obtained by saponifying polyvinyl acetate, and polyvinyl alcohol having a saponification degree of 80 to 99.8 mole % is generally used. This polyvinyl alcohol preferably has an average polymerization degree of 200 to 3000. When the average polymerization degree is less than 200, the penetration resistance of the laminated glass to be obtained may be deteriorated, and on the contrary when the average polymerization degree is more than 3000, the moldability of the resin film may be deteriorated, and rigidity of the resin film become too high and therefore the processability may be deteriorated. More preferable average polymerization degree is 500 to 2000.

Incidentally, an average polymerization degree and a saponification degree of polyvinyl alcohol resins can be measured according to, for example, JIS K 6726 "Testing methods for polyvinyl alcohol".

The above aldehyde is not particularly limited, aldehydes having 1 to 10 carbon atoms are generally employed and for example, n-butyl aldehyde, iso-butyl aldehyde, n-valeraldehyde, 2-ethylbutyl aldehyde, n-hexyl aldehyde, n-octyl aldehyde, n-nonyl aldehyde, n-decyl aldehyde, formaldehyde, acetaldehyde and benzaldehyde are given. Among others, n-butyl aldehyde, n-hexyl aldehyde and n-valeraldehyde are suitably used. Butyl aldehyde having 4 carbon atoms is particularly preferably used.

The above plasticized polyvinyl acetal resin can be obtained by making the above polyvinyl acetal resin contain a plasticizer. The above plasticizer is not particularly limited and publicly known plasticizers which are generally used as a plasticizer for this kind of interlayers can be used, and there are given organic type plasticizers such as monobasic organic acid type ester and polybasic organic acid type ester; and phosphoric acid type plasticizers such as organic phosphoric acid and organic phosphorous acid. These plasticizers may be used alone or may be used in combination of two or more species and are selectively used depending on the species of the polyvinyl acetal resin in consideration of the compatibility with resins.

The above monobasic organic acid ester type plasticizer is not particularly limited and includes, for example, glycol type esters obtained by a reaction between glycol such as triethylene glycol, tetraethylene glycol and tripropylene glycol and monobasic organic acid such as butyric acid, isobutyric acid, capric acid, 2-ethylbutyric acid, heptylic acid, n-octylic acid, 2-ethylhexylic acid, pelargonic acid (n-nonylic acid) and decylic acid. Among others, there are suitably used monobasic organic acid esters of triethylene glycol such as triethylene glycol-dicapric acid ester, triethylene glycol-di-2-ethylbutyric acid ester, triethylene glycol-di-n-octyl acid ester, triethylene glycol-di-2-ethylhexylic acid ester.

The above polybasic organic acid ester type plasticizer is not particularly limited and includes, for example, esters of polybasic organic acid such as adipic acid, sebacic acid and azelaic acid, and straight-chain or branched alcohols having 4 to 8 carbon atoms. Among others, dibutyl sebacate, dioctyl azelate, and dibutyl carbitol adipate are suitably used.

The above organic phosphate type plasticizer is not particularly limited and includes, for example, tributoxyethyl phosphate, isodecylphenyl phosphate and triisopropyl phosphite.

Particularly in these plasticizers, triethylene glycol-di-2-ethylbutyrate (3GH), triethylene glycol-di-2-ethylhexanoate (3GO), tetraethylene glycol-di-2-ethylhexanoate (4GO) and tetraethylene glycol di-2-butyl sebacate are preferably used.

An amount of these plasticizers to be blended is preferably 20 to 60 parts by weight with respect to 100 parts by weight of polyvinyl acetal resin. When the amount to be blended is less than 20 parts by weight, an impact absorbing property of the interlayer and the laminated glass to be obtained may become insufficient, and on the contrary when it is more than 60 parts by weight, the plasticizer bleeds out and an optical strain of the interlayer and the laminated glass to be obtained may become large or transparency and adhesive property between the glass plate and the interlayer may be impaired. More preferable amount of the plasticizers to be blended is 30 to 50 parts by weight.

The heat ray shielding fine particles used in the present invention are not particularly limited, but for example, at least one species selected from the group consisting of indium tin oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, zinc antimonates, lanthanum hexaboride fine particles and cerium hexaboride fine particles is suitably used.

In a resin layer in which these heat ray shielding fine particles are dispersed, all transmitted colors takes on light yellow-green color and the resin layer has an excellent function of shielding infrared rays (heat rays).

The above heat ray shielding fine particles preferably have an average particle diameter of 80 nm or smaller. When the average particle diameter is larger than 80 nm, scattering of visible light due to the heat ray shielding fine particles becomes remarkable and therefore the transparency of the interlayer for laminated glass to be obtained may be impaired. Consequently, when the laminated glass is formed, haze is deteriorated and it becomes impossible to satisfy, for example, a high level of transparency required in windshields of automobiles. A more preferable average particle diameter is 10 to 80 nm. Incidentally, particle diameters and an average particle diameter of the heat ray shielding fine particles can be measured by a dynamic light scattering method by using Ar laser as a light source using a light scattering measuring apparatus (for example, "DLS-6000AL" manufactured by Otsuka Electronics Co., Ltd.)

Preferably, such heat ray shielding fine particles are uniformly dispersed in the above heat ray shielding resin layer. By uniformly dispersing them, the heat ray shielding property becomes high throughout the whole layer, and adhesive force between the glass plate and the interlayer becomes controllable and penetration resistance of the interlayer for laminated glass and the laminated glass becomes excellent.

In the above heat ray shielding resin layer, the above heat ray shielding fine particles are preferably dispersed so as to be $1/\mu m^2$ or less in the density of particles having a particle diameter of 100 nm or larger. That is, when a photograph of the interlayer for laminated glass of the present invention is taken and observed with a transmission electron microscope, the above heat ray shielding fine particles are preferably dispersed so as to be in a state that the above heat ray shielding fine particles having a particle diameter of 100 nm or larger are not observed or if such fine particles are observed, when this heat ray shielding fine particle having a particle diameter of 100 nm or larger is positioned at the center of a frame of 1 $\mu m^2$, another heat ray shielding fine particle having a particle diameter of 100 nm or larger is not observed in this frame of 1 $\mu m^2$. Thereby, when the laminated glass is formed, a low haze value and excellent transparency and high heat shielding property are obtained throughout the whole area. Incidentally, observation with a transmission electron microscope can be carried out by taking a photograph at an acceleration voltage of 100 kV using a transmission electron microscope (for example, a transmission electron microscope H-7100 FA type manufactured by Hitachi, Ltd.).

An amount of these heat ray shielding fine particles to be blended is preferably 0.1 to 3 parts by weight with respect to 100 parts by weight of all adhesive resins (for example, polyvinyl acetal resin). When the amount to be blended is less than 0.1 parts by weight, an adequate effect of shielding infrared rays (heat rays) may not be exerted and the heat ray shielding property of the interlayer for laminated glass and the laminated glass to be obtained may not be adequately improved, and on the contrary when it is more than 3 parts by weight, the transparency of visible light of the interlayer for laminated glass and the laminated glass to be obtained may be deteriorated or a haze value may become larger.

On the other hand, the above color tone compensation resin layer toned to have a color complementary to the color tone of the heat ray shielding fine particle is obtainable by dispersing coloring agents of blue color tone and red color tone, or a coloring agent of violet color tone, which has a color complementary to the color tone of yellow-green color which a resin layer formed by dispersing the above heat ray shielding fine particles in the adhesive resin has. The coloring agent for this is not particularly limited and includes, for example, phthalocyanine type blue coloring agent, indanthren type blue coloring agent and anthraquinone type blue coloring agent as a blue coloring agent, perylene type red coloring agent and anthraquinone type red coloring agent as a red coloring agent, and oxazine type violet coloring agent, anthraquinone type violet coloring agent and dichloroquinacridone type violet coloring agent as a violet coloring agent.

An amount of these coloring agents, which has a color complementary to the color tone of the heat ray shielding fine particle, to be blended is preferably 0.0005 to 0.05 parts by weight with respect to 100 parts by weight of all adhesive resins. When the amount to be blended is less than 0.0005 parts by weight, an adequate effect of complementary color may not be exerted and the transparent property of the interlayer for laminated glass and the laminated glass to be obtained may not be adequately improved, and on the contrary when it is more than 0.05 parts by weight, the transparency of visible light of the interlayer for laminated glass and the laminated glass to be obtained may be deteriorated or a haze value may become larger.

Here, it was found that if it is pretended to add the coloring agent, which has a color complementary to the color tone of the heat ray shielding fine particle, to the above heat ray shielding resin layer, an oxidation-reduction reaction occurs between the coloring agent added and the heat ray shielding fine particles, and therefore the heat ray shielding resin layer is colored in yellow tone and the transparency of the laminated glass is impaired. Therefore, the heat ray shielding fine particles and the coloring agent which has a color complementary to the color tone of this heat ray shielding fine particle cannot be used together in the same layer.

And so, a heat ray shielding resin layer containing the heat ray shielding fine particles and a color tone compensation resin layer toned to have a color complementary to the color tone of this heat ray shielding fine particle were separately formed and laminated, and consequently it was found that unexpectedly, thereby, it is possible to make the color tone of the interlayer for laminated glass to be obtained transparent so as to look a natural color. In this case, it is preferred that the heat ray shielding resin layer and the color tone compensation resin layer are adjacent to each other in that the realization of transparent property can be effectively achieved.

The above ultraviolet absorbing resin layer can be obtained by making an adhesive resin contain an ultraviolet absorber. The ultraviolet absorber is not particularly limited and includes ultraviolet absorbers such as malonic ester type compounds, anilide oxalate type compounds, benzotriazole type compounds, benzophenone type compounds, triazine type compounds, benzoate type compounds and hindered amine type compounds. Among others, benzotriazole type compounds such as 2-(2'-hydroxy-5'-methylphenyl)benzotriazole (trade name "TINUVIN P" produced by CIBA-GEIGY Corporation), 2-(2'-hydroxy-3',5'-di-t-methylphenyl)benzotriazole (trade name "TINUVIN 320" produced by CIBA-GEIGY Corporation), 2-(2'-hydroxy-3'-t-butyl-5'-methylphenyl)-5-chlorobenzotriazole (trade name "TINUVIN 326" produced by CIBA-GEIGY Corporation) and 2-(2'-hydroxy-3',5'-di-amylphenyl)benzotriazole (trade name "TINUVIN 328" produced by CIBA-GEIGY Corporation) are preferred. Also, hindered amine type compounds such as trade name "ADK STAB LA-57" produced by Adeka Argus Chemical Co., Ltd. are preferred.

An amount of these ultraviolet absorbers to be blended is preferably 0.1 to 5 parts by weight with respect to 100 parts by weight of all adhesive resins. When the amount to be blended is less than 0.1 parts by weight, an adequate shielding effect of absorbing ultraviolet rays may not be exerted and weather resistance and light resistance of the interlayer for laminated glass to be obtained may not be adequately improved, and on the contrary when it is more than 5 parts by weight, the transparency of visible light of the interlayer for laminated glass and the laminated glass to be obtained may be deteriorated or a haze value may become larger.

Further, when the adhesive resin is a plasticized polyvinyl acetal resin, to the heat ray shielding resin layer, the color tone compensation resin layer and the ultraviolet absorbing resin layer, adhesive force controlling agents such as alkali metal salts or alkaline earth metal salts of an organic acid or an inorganic acid and modified silicone oil; and antioxidants such as t-butylhydroxytoluene (trade name "Sumilizer BHT" produced by Sumitomo Chemical Co., Ltd.) and tetrakis-[methylene-3-(3',5'-di-t-butyl-4'-hydroxyphenyl)propionate]methane (trade name "Irganox 1010" produced by CIBA-GEIGY Corporation) may be added and further publicly known additives such as a light stabilizer, a surfactant, a flame retardant, an antistatic agent, a heat reflector and a heat absorbing agent may be added.

Particularly, it is preferred that the antioxidant is contained at least in the heat ray shielding resin layer, and it is more preferred that the antioxidant is contained in any resin layer of the heat ray shielding resin layer, the color tone compensation resin layer and the ultraviolet absorbing resin layer. By making the above resin layer contain the antioxidant, an oxidation reaction accompanied by coloring can be inhibited. By making any resin layer contain the antioxidant, it is easy to maintain an effect of inhibiting the oxidation reaction since even though an antioxidant in some layer is consumed, the concentration of the antioxidant is maintained by the migration of antioxidant between resin layers.

Since the heat ray shielding fine particles causes the oxidation reaction accompanied by coloring due to ultraviolet rays, it is preferred to separately provide the above ultraviolet absorbing layer in order to inhibit the penetration of ultraviolet to the heat ray shielding resin layer.

The above ultraviolet absorbing resin layer may contain the antioxidant, but when it contains a large amount of the antioxidant together with the ultraviolet absorber, the transparency may be deteriorated with time, and therefore the ultraviolet absorber and the antioxidant are preferably contained in each layer in a small amount, respectively. Specifically, as for the proportions of the antioxidant contained in the heat ray shielding resin layer, the color tone compensation resin layer and the ultraviolet absorbing resin layer, respectively, the proportion of the antioxidant in the heat ray shielding resin layer is preferably 0.7 to 1 and the proportion of the antioxidant in the color tone compensation resin layer is preferably 0.3 to 1 when the proportion of the antioxidant in the ultraviolet absorbing resin layer is assumed to be 1. Further, when a benzotriazole type compound and a hindered amine type compound are used in combination as an ultraviolet absorber, it is preferred to increase the amount of the antioxidant to be added because inhibiting of the oxidation reaction is especially required. By making any resin layer contain the antioxidant, it is easy to maintain an effect of inhibiting the oxidation reaction since even though an antioxidant in some layer is consumed, the concentration of the antioxidant is maintained by the migration of antioxidant between resin layers.

Preferably, the overall film thickness of the interlayer for laminated glass of the present invention is generally within a range of 0.3 to 1.6 mm in practice as with the usual transparent interlayer for laminated glass in consideration of minimum requirements as laminated glass of penetration resistance and weather resistance. Preferably, the film thickness is particularly within a range of 0.7 to 1.6 mm.

Particularly, when this interlayer for laminated glass is composed of the heat ray shielding resin layer, the color tone compensation resin layer and the ultraviolet absorbing resin layer, it is preferred to construct it in such a way that a thickness of the heat ray shielding resin layer is 15 to 25%, a thickness of the color tone compensation resin layer is 5 to 25% and a thickness of the ultraviolet absorbing resin layer is 50 to 80% with respect to the overall film thickness of the interlayer. When this interlayer for laminated glass is composed of the heat ray shielding resin layer and the color tone compensation resin layer, it is preferred to construct it in such a way that a thickness of the heat ray shielding resin layer is 50 to 80% and a thickness of the color tone compensation resin layer is 20 to 50% with respect to the overall film thickness of the interlayer.

That is, when the color tone compensation resin layer becomes too thick, the transparency decreases. Therefore, the upper limit of the range of the thickness of the heat ray shielding resin layer which can secure the transparent property is restricted. When the color tone compensation resin layer becomes too thin, it becomes difficult to adequately compensate the color tone. Further, when the heat ray shielding resin layer becomes too thin, a degree of yellow-green color tone is reduced to become small, but it becomes difficult to adequately secure the heat ray shielding property.

Further, on the above interlayer for laminated glass formed by laminating the heat ray shielding resin layer, the color tone compensation resin layer and the ultraviolet absorbing resin layer and the above interlayer for laminated glass formed by laminating the heat ray shielding resin layer and the color tone compensation resin layer, a transparent resin layer, which has a composition similar to a usual transparent interlayer for laminated glass not containing the heat ray shielding fine particles and the coloring agent which has a color complementary to the color tone of this heat ray shielding fine particle, may be further laminated to form an interlayer.

The above heat ray shielding resin layer can be obtained by a method in which the above adhesive resin such as polyvinyl acetal resin, the heat ray shielding fine particles, the plasticizer and various additives to be added as required are kneaded using an extruder, a plastograph, a kneader, a Banbury mixer, calendaring rolls and the like and the kneaded mixture is shaped into a film in sheet form by usual methods of forming a film such as extrusion, calendaring, pressing. The heat ray shielding resin layer can be obtained by dispersing the heat ray shielding fine particles in the plasticizer with a microbead mill and the like and then kneading a polyvinyl acetal resin with the heat ray shielding fine particle-dispersed plasticizer with a mixing roller and the like and shaping the kneaded mixture into a film in sheet form.

The above color tone compensation resin layer can be obtained by a method in which the above adhesive resin such as polyvinyl acetal resin, the above coloring agent which has a color complementary to the color tone of the heat ray shielding fine particle, the plasticizer and various additives to be added as required are kneaded using an extruder, a plastograph, a kneader, a Banbury mixer, calendaring rolls and the like and the kneaded mixture is shaped into a film in sheet form by usual methods of forming a film such as extrusion, calendaring, pressing.

Further, the above ultraviolet absorbing resin layer can be obtained by a method in which the above adhesive resin such as polyvinyl acetal resin, an ultraviolet absorber, the plasticizer and various additives to be added as required are kneaded using an extruder, a plastograph, a kneader, a Banbury mixer, calendaring rolls and the like and the kneaded mixture is shaped into a film in sheet form by usual methods of forming a film such as extrusion, calendaring, pressing.

The interlayer for laminated glass of the present invention can be produced by a method of overlaying the heat ray shielding resin layer and the color tone compensation resin layer, and further the ultraviolet absorbing resin layer as required, which are separately shaped into a film as described above, and heating and pressurizing this laminate to unify these resin layers. Also, the interlayer for laminated glass of the present invention can be produced by a method of forming a unified film by a multi-layer extrusion method using compounds for forming a film of the heat ray shielding resin layer and compounds for forming a film of the color tone compensation resin layer, and further compounds for forming a film of the ultraviolet absorbing resin layer as required. As an alternative method, it can be produced by a method of forming a film concurrently with the production of laminated glass by overlaying the heat ray shielding resin layer and the color tone compensation resin layer, and further the ultraviolet absorbing resin layer as required between two glass plates and heating and pressurizing this laminate to unify these resin layers.

In this case, the usual transparent resin layer containing no heat ray shielding fine particles or no coloring agent which has a color complementary to the color tone of this heat ray shielding fine particle may be used in combination. When this usual transparent resin layer or the above ultraviolet absorbing resin layer is used in combination, it is preferred to laminate the heat ray shielding resin layer and the color tone compensation resin layer so as to be adjacent to each other in order to effectively attain transparent color tone of the interlayer for laminated glass to be obtained.

The laminated glass of the present invention can be produced in the same production method as that of usual laminated glass. For example, it can be produced by sandwiching the above-mentioned interlayer for laminated glass between at least two transparent glass plates, and then by pressing it through a press roll or by putting it in a rubber bag, bonding preliminarily at a temperature of about 70 to 110° C. while deaerating air remaining between the glass plate and the interlayer by vacuum aspiration to form a laminate and then bonding this deaerated laminate formally at a temperature of about 120 to 150° C. and at a pressure of about 0.98 to 1.47 MPa in an autoclave or through a press.

Further, a transparent glass plate is not particularly limited and a transparent glass plate commonly used can be used. As such a glass plate, there are given, for example, various inorganic glass plates such as float plate glass, heat absorbing plate glass, polished plate glass, molded plate glass, meshed plate glass and wired plate glass; and organic glass plates such as polycarbonate plate and polymethyl methaclylate plate. These glass plates may be used alone or in combination of two or more species. Among others, heat absorbing plate glass is preferably used. In addition, thicknesses of these glass plates may be appropriately selected depending on applications and are not particularly limited.

Effect Of the Invention

In accordance with the present invention, infrared rays (heat rays), having a large thermal effect, of light rays entering from the laminated glass are shielded by being absorbed or reflected by the heat ray shielding resin layer containing the heat ray shielding fine particles, and therefore a temperature rise of the interior of an automobile or of a building is inhibited and thermal malfunctions of a human body and a substance can be prevented. In addition, though the heat ray shielding resin layer takes on the yellow-greenish color tone due to the presence of the heat ray shielding fine particles, the color tone compensation resin layer toned to have a color complementary to the color tone of the above heat ray shielding fine particles causes the yellow-greenish tone, resulting from the heat ray shielding fine particles, of the heat ray shielding resin layer to become achromatic color, and since the heat ray shielding fine particles and the coloring agent for compensating the color tone are contained in separate layers, the heat ray shielding fine particles does not contact with the coloring agent for compensating the color tone in a layer, and coloring due to a reaction of both does not occur. As a result, a state that the interlayer and the laminated glass look transparent and in natural color is continued. Further, the interlayer having an ultraviolet absorbing resin layer prevents the discoloration of the heat ray shielding resin layer due to ultraviolet and an ultraviolet shielding property is imparted; and the fading and the discoloration of interior or fixture can be protected.

Accordingly, the applications of the interlayer for laminated glass and the laminated glass of the present invention are not particularly limited, but they are suitably used for the applications, in which the heat ray shielding property and the transparent property are especially required, for example, of windshields, side glass, rear windshields and roof glass of automobiles; glass sections of vehicles such as aircrafts and electric trains, and windowpanes of buildings.

BEST MODE FOR CARRYING OUT THE INVENTION

Hereinafter, the aspect of the present invention will be described in more detail by way of Examples, but the present invention is not limited to these Examples.

EXAMPLE 1

(1) Synthesis of Polyvinyl Butyral Resin

A polyvinyl alcohol, 275 parts by weight, having an average polymerization degree of 1700 and a saponification degree of 99.2 mole % was added to 2890 parts by weight of pure water and the mixture was dissolved by heating. A temperature of this reaction system was adjusted to 15° C., and to this solution, 201 parts by weight of a 35% by weight hydrochloric acid catalyst and 157 parts by weight of n-butyl aldehyde were added, and a temperature of this mixture was kept at this temperature to precipitate a reactant. Then, the reaction system was kept at 60° C. for 3 hours to complete the reaction, and then the reaction system was cleaned with excessive water to wash out unreacted n-butyl aldehyde, and the hydrochloric acid catalyst was neutralized with an aqueous solution of sodium hydroxide, and further the reaction system was washed for 2 hours with excessive water and dried to obtain a polyvinyl butyral resin in white powder form. An average butyralization degree of this resin was 68.5 mole %.

(2) Preparation of Heat Ray Shielding Fine Particle-dispersed Plasticizer 40 parts by weight of triethylene glycol-di-2-ethylbutyrate (3GO) and 1 part by weight of indium tin oxide (ITO) fine particles were charged, and to this, 0.1 parts by weight of a long chain alkyl phosphate ester was added as a dispersant, and the ITO fine particles were dispersed in the above plasticizer with a horizontal microbead mill to prepare a heat ray shielding fine particle-dispersed plasticizer. An average particle size of the ITO fine particles in this heat ray shielding fine particle-dispersed plasticizer was 35 nm.

(3) Preparation of Interlayer to be a Heat Ray Shielding Resin Layer

To 100 parts by weight of the polyvinyl butyral resin obtained in the above (1) was added 40 parts by weight of the heat ray shielding fine particle-dispersed plasticizer obtained in the above (2), and magnesium 2-ethylbutyrate was further added as an adhesive force controlling agent in such a way that a magnesium content is 60 ppm throughout the whole system, and the mixture was adequately melted and kneaded with a mixing roller and then was molded by pressing at 150° C. for 30 minutes with a press molding machine to prepare an interlayer having an average film thickness of 0.76 mm to be a heat ray shielding resin layer. An average particle size of the ITO fine particles in this film was 56 nm, and particles having a particle size of 100 nm or larger were not observed.

(4) Preparation of Interlayer to be a Color Tone Compensation Resin Layer

To 100 parts by weight of the polyvinyl butyral resin obtained in the above (1), 0.15 parts by weight of blue pigment toner (trade name "SG-5A1083N" produced by Sumika Color Co., Ltd.) and 0.04 parts by weight of red pigment toner (trade name "SG-100N" produced by Sumika Color Co., Ltd.), which are adjusted to have the color tone complementary to the yellow-greenish color of the above ITO fine particle, were added, and magnesium 2-ethylbutyrate was further added as an adhesive force controlling agent in such a way that a magnesium content is 60 ppm throughout the whole system, and the mixture was adequately melted and kneaded with a mixing roller and then was molded by pressing at 150° C. for 30 minutes with a press molding machine to prepare an interlayer having an average film thickness of 0.38 mm to be a color tone compensation resin layer.

(5) Preparation of Interlayer to be an Ultraviolet Absorbing Resin Layer

To 100 parts by weight of polyvinyl butyral resin obtained in the above (1), 2 parts by weight of a mixture (weight ratio of 7:3) of a benzotriazole-type ultraviolet absorber (trade name "TINUVIN P" produced by CIBA-GEIGY Corporation) and a hindered amine-type ultraviolet absorber (trade name "ADK STAB LA-57" produced by Adeka Argus Chemical Co., Ltd.) was added, and magnesium 2-ethylbutyrate was further added as an adhesive force controlling agent in such a way that a magnesium content is 60 ppm throughout the whole system, and the mixture was adequately melted and kneaded with a mixing roller and then was molded by pressing at 150° C. for 30 minutes with a press molding machine to prepare an interlayer having an average film thickness of 0.38 mm to be an ultraviolet absorbing resin layer.

(6) Preparation of Interlayer for Laminated Glass and Laminated Glass

The above-mentioned interlayer to be a color tone compensation resin layer, the interlayer to be a heat ray shielding resin layer and the interlayer to be an ultraviolet absorbing resin layer were overlaid in this order, and an interlayer for laminated glass having a three-layer constitution was produced once by pressing. This interlayer for laminated glass having a three-layer constitution was sandwiched between two transparent float glass (30 cm in length, 30 cm in width and 2.5 mm in thickness) and this was put in a rubber bag and deaerated at a vacuum of 2.6 kPa for 20 minutes, and then this was moved into an oven in a state of being deaerated and subjected to vacuum press while being further retained at 90° C. for 30 minutes. Laminated glass thus preliminarily pressure bonded was subjected to pressure bonding under the conditions of 135° C. and a pressure of 1.2 MPa for 20 minutes in an air autoclave to prepare laminated glass. A sectional view of this laminated glass is shown in FIG. 1. In FIG. 1, a reference numeral 10 represents the laminated glass, a reference numeral 10a represents the heat ray shielding resin layer, a reference numeral 10b represents the color tone compensation resin layer, a reference numeral 10c represents the ultraviolet absorbing resin layer, and reference numerals 10d and 10e represent transparent float glass plates.

EXAMPLE 2

An interlayer for laminated glass, having a two-layer constitution, was prepared by the same procedure as in Example 1 except for not using an interlayer for absorbing ultraviolet rays, and laminated glass was prepared in the same procedure as in Example 1 using this interlayer for laminated glass having a two-layer constitution. A sectional view of this laminated glass is shown in FIG. 2. In FIG. 2, a reference numeral 10 represents laminated glass, a reference numeral 10a represents a heat ray shielding resin layer, a reference numeral 10b represents a color tone compensation resin layer, and reference numerals 10d and 10e represent transparent float glass plates.

COMPARATIVE EXAMPLE 1

An interlayer for laminated glass was prepared in following the same procedure as in Example 1 except for adding 0.075 parts by weight of blue pigment toner (trade name "SG-5A1083N" produced by Sumika Color Co., Ltd.) and 0.02 parts by weight of red pigment toner (trade name "SG-100N" produced by Sumika Color Co., Ltd.) to the interlayer to be a heat ray shielding resin layer and not adding 0.15 parts by weight of blue pigment toner and 0.04 parts by weight of red pigment toner to the interlayer to be a color tone compensation resin layer, and laminated glass was prepared in the same procedure as in Example 1 using the obtained interlayer for laminated glass.

(Evaluation)

With regard to the interlayers for laminated glass and the laminated glass obtained in Examples 1 and 2 and Comparative Example 1, visible light transmittance and solar radiation transmittance were measured by the following methods, and the heat ray shielding property and the transparent property were evaluated. In addition, measurement was performed assuming that in the laminated glass 10 in FIG. 1, the ultraviolet absorbing resin layer 10d was on the outer side (outdoor) and in the laminated glass 10 in FIG. 2, the heat ray shielding resin layer 10d was on the outer side (outdoor). The results of measurement are shown in Table 1.

(1) Measurement of Visible Light Transmittance and Solar Radiation Transmittance The transmittance of 300 to 2500 nm in wavelength in the obtained laminated glass was measured using a spectrophotometer ("UV-3100" manufactured by Shimadzu Corporation), and the visible light transmittance of 380 to 780 nm in wavelength and the solar radiation transmittance of 300 to 2500 nm in wavelength were determined according to JIS Z 8722 and JIS R 3106.

(2) Evaluation of Appearance of Laminated Glass

The color tone of the entire laminated glass was visually evaluated.

TABLE 1

|  | Example 1 | Example 2 | Comparative Example 1 |
|---|---|---|---|
| Visible light transmittance (%) | 84 | 84 | 84 |
| Solar radiation transmittance (%) | 54 | 54 | 54 |
| Appearance of laminated glass | transparent | transparent | yellowish |

INDUSTRIAL APPLICABILITY OF THE INVENTION

In accordance with the present invention, it is possible to provide an interlayer for laminated glass having an excellent heat ray shielding property and an excellent transparent property, and laminated glass using this interlayer for laminated glass.

Figure 1:
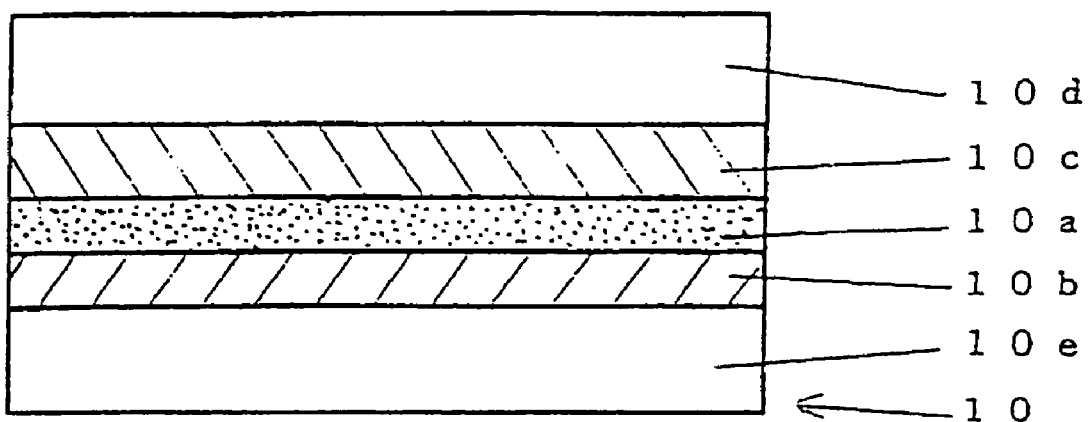
FIG. 1 a sectional view showing an embodiment of laminated glass of the present invention FIG. 2 a sectional view showing another embodiment of laminated glass of the present invention
Figure 2:
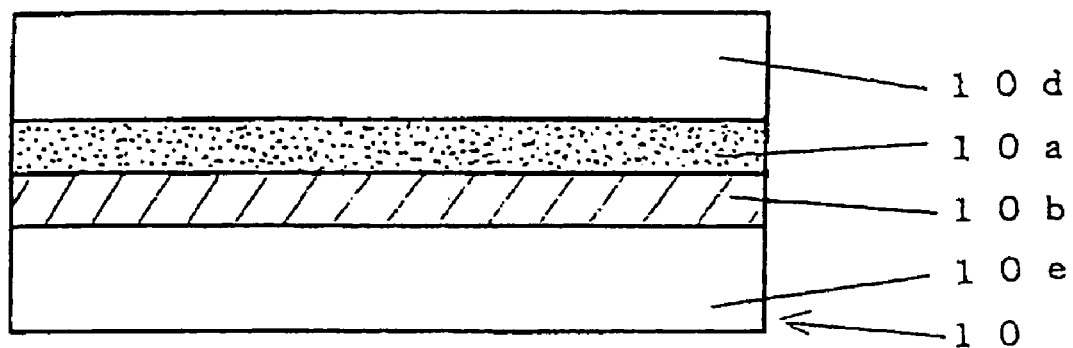

DESCRIPTION OF THE NUMERALS 10 laminated glass
10a heat ray shielding resin layer
10b color tone compensation resin layer
10c ultraviolet absorbing resin layer
10d transparent float glass plate
10e transparent float glass plate

The invention claimed is:

1. An interlayer for laminated glass, which is formed by laminating a plurality of layers comprising an adhesive resin, a heat ray shielding resin layer containing a heat ray shielding fine particle, a color tone compensation resin layer toned to have a color complementary to the color tone of the heat ray shielding fine particle being laminated, and an ultraviolet absorbing resin layer.

2. The interlayer for laminated glass according to claim 1, wherein the adhesive resin is a polyvinyl acetal resin.

3. Laminated glass, wherein the interlayer for laminated glass according to claim 2 is bonded between transparent glass plates.

4. Laminated glass, wherein the interlayer for laminated glass according to claim 1 is bonded between transparent glass plates.

5. The interlayer for laminated glass according to claim 1, wherein a heat ray shielding resin layer and a color tone compensation resin layer are adjacent to each other.

* * * * *